United States Patent [19]

Booth

[11] Patent Number: 5,611,941

[45] Date of Patent: Mar. 18, 1997

[54] METHOD FOR FORMING A FERROELECTRIC LIQUID CRYSTAL SPATIAL LIGHT MODULATOR UTILIZING A PLANARIZATION PROCESS

[75] Inventor: John S. Booth, Austin, Tex.

[73] Assignee: Rainbow Display Serivices, Austin, Tex.

[21] Appl. No.: 503,036

[22] Filed: Jul. 17, 1995

[51] Int. Cl.⁶ ........................................................ B44C 1/22
[52] U.S. Cl. .................................. 216/23; 216/24; 216/38; 216/39
[58] Field of Search .................................. 216/23, 24, 38, 216/39, 56; 437/181, 228 PL; 156/636.1, 659.11

[56] References Cited

U.S. PATENT DOCUMENTS

| | | |
|---|---|---|
| 4,689,113 | 8/1987 | Balasubramanyam et al. .. 437/228 PL |
| 4,919,633 | 4/1990 | Yamazaki et al. . |
| 4,924,215 | 5/1990 | Nelson . |
| 4,938,574 | 7/1990 | Kaneko et al. . |
| 5,129,727 | 7/1992 | Hanyu et al. . |
| 5,202,779 | 4/1993 | Shinomiya . |
| 5,251,050 | 10/1993 | Kurematsu et al. . |
| 5,262,083 | 11/1993 | Mori et al. . |
| 5,278,683 | 1/1994 | Nishida et al. . |
| 5,282,069 | 1/1994 | Sato . |
| 5,296,096 | 3/1994 | Enomoto et al. . |
| 5,298,913 | 3/1994 | Numao et al. . |
| 5,300,254 | 4/1994 | Geelhaar et al. . |
| 5,300,928 | 4/1994 | Yamazaki . |
| 5,323,172 | 6/1994 | Koden . |
| 5,340,491 | 8/1994 | Enomoto et al. . |
| 5,343,217 | 8/1994 | Kim . |
| 5,346,048 | 9/1994 | Wilhelm . |
| 5,347,378 | 9/1994 | Handschy et al. . |
| 5,348,685 | 9/1994 | Mochizuki et al. . |
| 5,350,537 | 9/1994 | Itoh et al. . |

*Primary Examiner*—William Powell
*Attorney, Agent, or Firm*—Gregory M. Howison

[57] ABSTRACT

A method for forming a spatial light modulator (SLM) comprises forming a substrate (10) underneath a layer of Ferro-Electric crystal material (14) with a plurality of mirrored elements (12) disposed on the surface thereof. The process involves forming a layer of low stress oxide on the surface of the substrate over control pads or conductive strips (24) which are connected to underlying control elements. Openings (30) are formed in the oxide, followed by a formation of a conformal layer of aluminum (32). This is etched to form plugs (36) and then the substrate is subjected to a chemical/mechanical planarization step. This involves polishing the substrate to provide an optically flat surface. Thereafter, a layer of aluminum is then disposed on the surface of the substrate, patterned and etched to form the mirrored elements (12).

7 Claims, 3 Drawing Sheets

METHOD FOR FORMING A FERROELECTRIC LIQUID CRYSTAL SPATIAL LIGHT MODULATOR UTILIZING A PLANARIZATION PROCESS

TECHNICAL FIELD OF THE INVENTION

The present invention pertains in general to spatial light modulators and, more particularly, to a spatial light modulator utilizing a ferroelectric liquid crystal having a planarized surface to increase the amount of light reflected therefrom.

BACKGROUND OF THE INVENTION

Reflective spatial light modulators (SLM) have been utilized due to the high speed output thereof. As processing techniques improve, the ability to manufacture small SLM arrays has increased. However, one disadvantage to the smaller arrays is that the irregularities in the surface utilized to create the reflective surface under the liquid crystal element becomes important.

In the construction of the reflective SLM, a semiconductor substrate is typically utilized to provide a control surface over which is formed an array of mirror elements, which mirror elements provide both a reflective surface and an electrical control for the liquid crystal. The liquid crystal is then disposed above the substrate with a transparent electrode disposed on the opposite side thereof. This provides for full control of the liquid crystal.

When light impinges upon the upper surface of the liquid crystal, it is transmitted therethrough to reflect off the upper mirrored surface of substrate. Depending upon the electrical characteristics of a particular mirrored element on the surface of the substrate, a phase shift of the light passing therethrough will result. External polarizing elements provide for selectivity of this light, which is conventional. When fabricating the substrate, an array of transistors or control elements are integrally fabricated on the substrate and then various layers of insulting material, conducting strips and possibly metal layers are disposed on the substrate above the active components to provide an interconnecting control network. This interconnecting network is fabricated from a number of processes involving multiple deposition, patterning and etching steps. This typically results in a very irregular surface relative to the wavelengths of light utilized in SLM applications. As dimensions of each of the mirrored elements in the array on the surface of the substrate decreases, this irregularity will be reflected in the contour of the mirrored element and will result in scattering of light. This will reduce the amount of light reflected in the direction of interest and, therefore, the brightness as perceived by the viewer.

SUMMARY OF THE INVENTION

The present invention disclosed and claimed herein comprises a method for forming a spatial light modulator. The method includes the steps of first forming a substrate of control elements having an irregular surface. Thereafter, a conformal insulating buffer layer is deposited over the substrate. Vias are then formed in the substrate to expose conductive portions of the underlying control elements. A layer of conformal conductive materials is then deposited over the substrate to fill the vias and then this layer etched to remove all portions outside the portion filling the via, which portions filling the vias are plugs. The structure is then subjected to a chemical/mechanical planarizing process to planarize the surface. Thereafter, mirrored conductive elements are formed over the substrate in contact with the main portion of the plugs. A layer of liquid crystal material is then disposed over the substrate having properties that change when a voltage is applied across one side thereof.

In another aspect of the present invention, the conformal layer of conductive material is sputtered aluminum and the conformal insulating buffer layer is a layer of low stress silicon dioxide.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
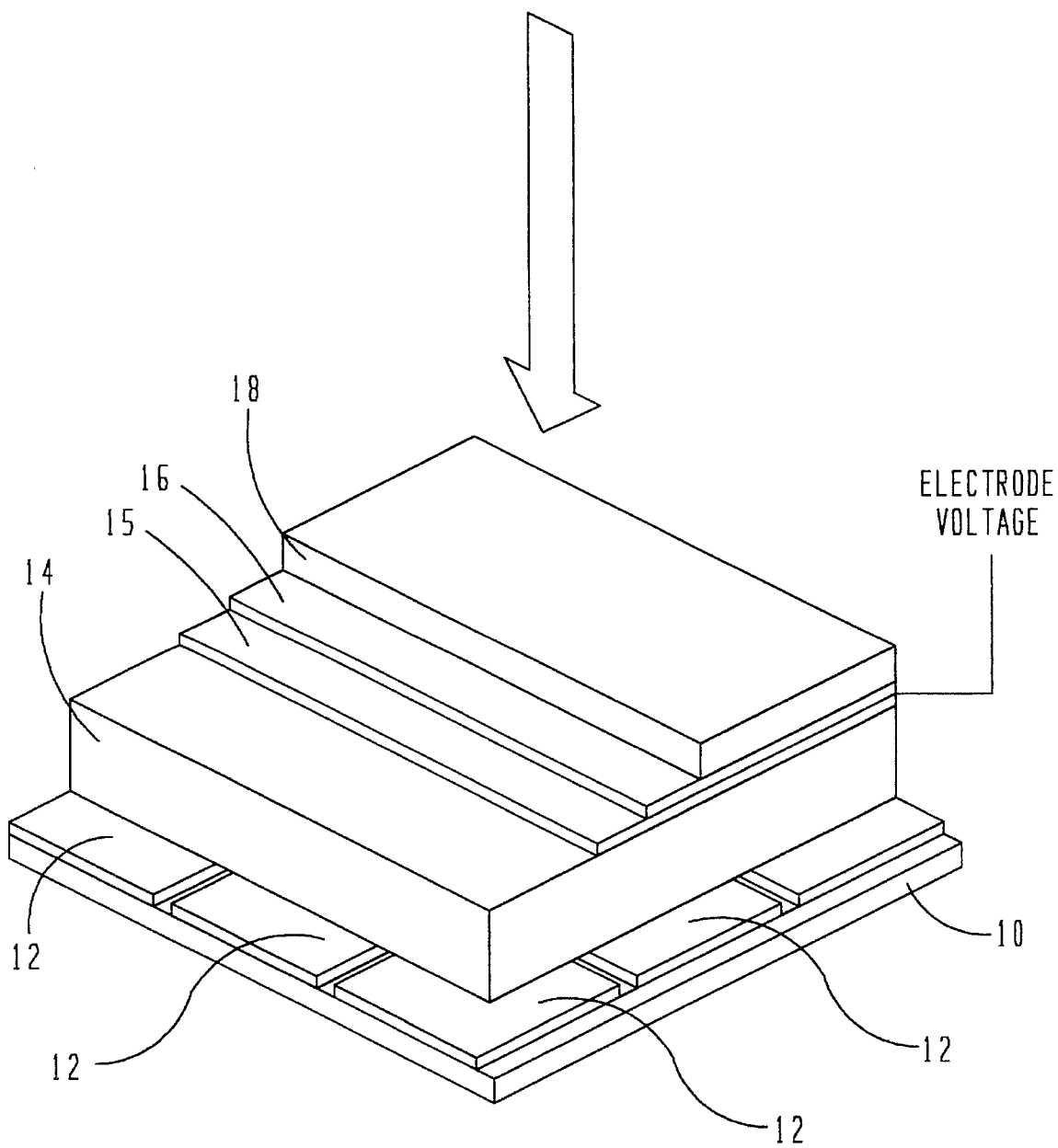
FIG. 1 illustrates a perspective view of the SLM of the present invention.

Referring now to FIG. 1, there is illustrated a perspective view of the spatial light modulator (SLM) of the present invention. A control substrate 10 is provided having disposed on the surface thereof an array of mirrored conductive elements 12. These conductive elements 12 are fabricated from, for example, aluminum in the preferred embodiment, and they are operable to allow the application of a voltage thereto from control transistors disposed in the substrate 10 and formed in underlying layers. Disposed above the array of mirrored elements 12 is a layer of Ferro-Electric Liquid Crystal (FELC) 14. On the upper surface of the FELC layer 14 is disposed an alignment layer 15 over which a layer of transparent electrode material 16 is disposed, which is typically fabricated utilizing a layer of indium-tin oxide (ITO). Above the ITO layer 16 is disposed an optical cover plate 18 which is typically fabricated utilizing a glass material.

In operation, polarized light impinges upon the surface of the cover plate 18, passes through the ITO layer 16 and then has the polarization thereof rotated as it passes through the FELC layer 14. Depending upon the voltage on any one of the mirrored elements 12, the polarization rotation can be altered in the locale of that particular mirror element. This is the result of the molecules being shifted to an opposing "tilt", depending upon the voltage state. This voltage, in the preferred embodiment, has two states to result in a binary SLM. However, the tilt could be a various function of multiple voltage levels to provide an analog SLM architecture. For discussion purposes, only the operation with respect to binary SLM will be described.

Figure 2:
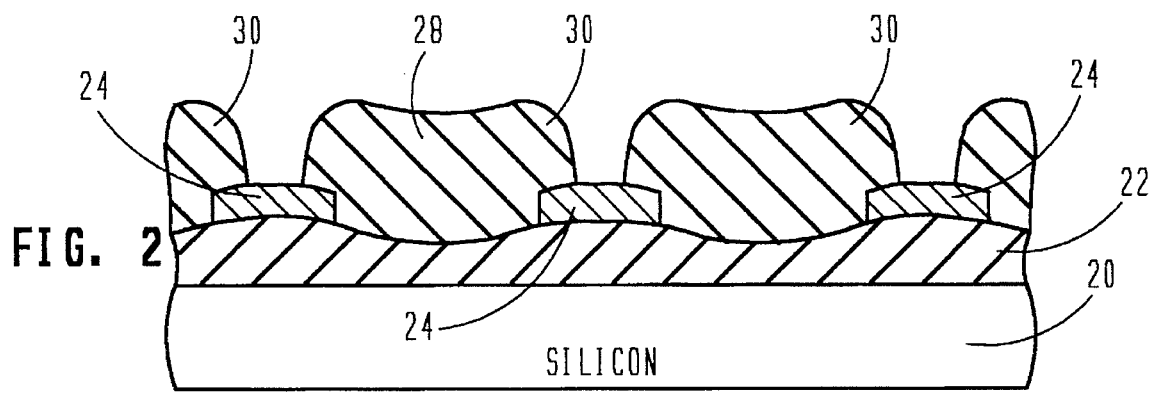
FIGS. 2–6 illustrate the process steps for forming the mirrored elements with a planarization step.

Referring now to FIG. 2, there is illustrated a cross sectional view of a semiconductor substrate 20 which is utilized to form the underlying substrate 10. The substrate 20 is a conventional silicon substrate of P-Type or N-Type conductivity. The substrate 20 is processed in a conventional manner to form active areas therein, in which transistors are formed. These transistors are typically formed by first defining a gate region, depositing or growing a layer of gate oxide over the surface thereof, followed by the formation of a gate electrode. A gate electrode is typically formed by an upper conductive layer of, for example, polycrystalline silicon (poly). This layer of poly is an amorphous layer of silicon which is deposited as a conformal layer, doped with an appropriate conductivity type to increase the conductivity thereof and then patterned to form the gate electrodes over the channel regions of the transistors. Thereafter, sources and drains are formed on either side of the gate via a self-aligned process. This is then followed by deposition of a layer of interlevel oxide (ILO) over the surface thereof such that another conductive layer, higher than the layer from which the gates were formed, can be formed. After formation thereof, openings are typically made in the ILO layer through which contacts are formed, i.e, conductive plugs, to allow interconnection of the sources and drains and the gates to the upper layers. The upper layer then has a layer of conductive material such as aluminum deposited for a metal layer, or another poly layer deposited for a double-poly process, and then patterned to form the conductive interconnect network. Depending upon the complexity, multiple layers of poly and multiple layers of metal can be utilized on the upper surfaces thereof.

During each step of processing of the semiconductor material, it is necessary to dispose a layer of conformal material and then etch away certain regions. For example, in the formation of the active regions, layers of field oxide are grown around active regions. This creates an upward rising wall of oxide on either side of the conductive region, defining the boundary of transistors. Further, whenever a conductive pattern is formed on the surface of the substrate it is necessary to deposit the conformal layer, followed by patterning and etching. For any interlevel oxide layer, the presence of these conductors creates substantial peaks and valleys in the oxide layers. Although some planarization techniques are utilized in these processes, the overall result for the finished product is a surface that is not "optically" flat.

Referring further to FIG. 2, there is illustrated a layer of interlevel oxide (ILO) 22 which is formed on the upper surface of the substrate 20. Although not illustrated, there can be multiple conductive layers within this ILO layer 22 and transistors formed in the upper surface of the substrate. On the upper surface of the ILO 22 are formed conductive strips 24 which can either be poly conductive strips or metal conductive strips. After formation of the conductive strips 24, a layer of oxide 28 is then formed over the substrate utilizing a chemical vapor deposition (CVD) process, resulting in a layer of low stress oxide approximately three microns in thickness. Each of the conductive strips 24 represents an interconnection from the upper surface of the layer 22 to a control element such as a transistor formed in the surface of substrate 20. This allows an electrical voltage to the selectively applied to any one of the conductive strips 24 or all of the conductive strips 24. Openings or vias 30 are then formed in the layer 28 to expose the surface of the conducive strips 24.

Figure 3:
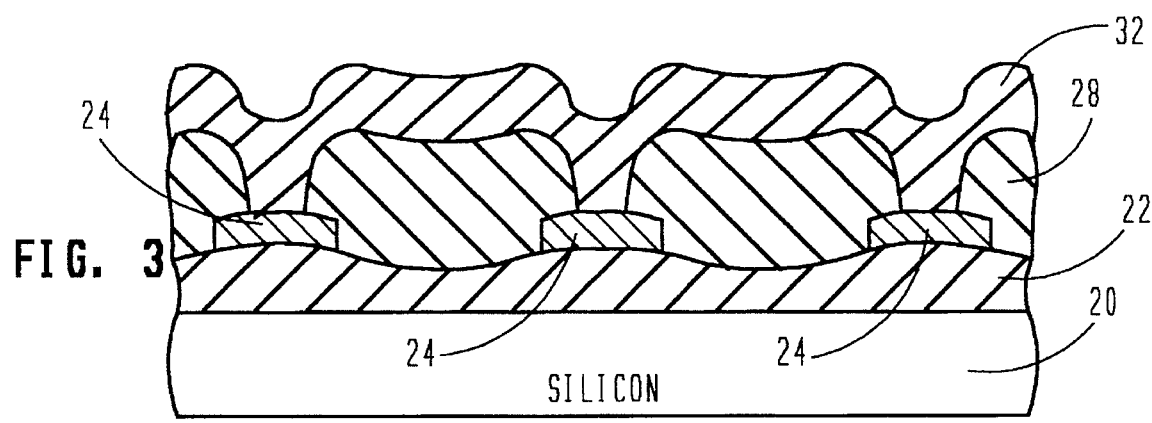
Figure 4:
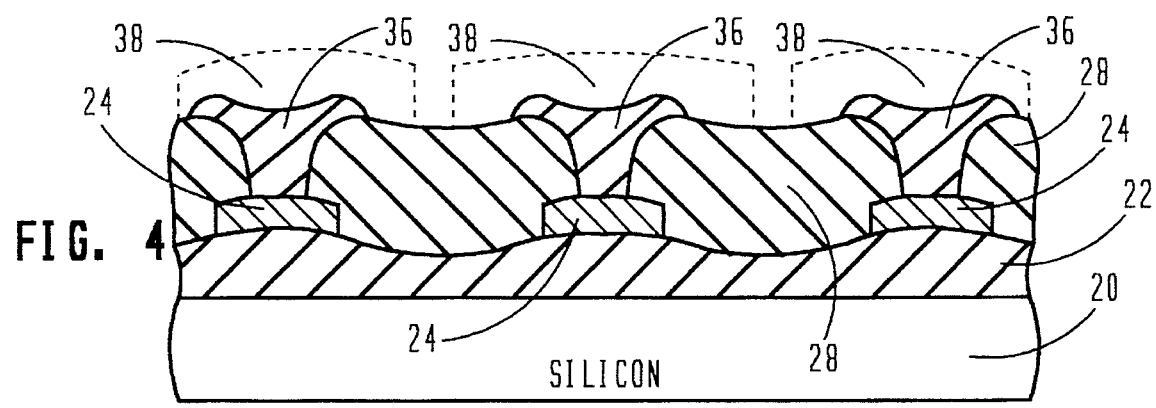

Referring now to FIG. 3, there is illustrated the next step in fabrication of the substrate 10. After formation of the vias 30, a conformal layer of aluminum is deposited over the substrate to a thickness of approximately 3 microns. This typically involves a sputtering technique wherein an aluminum layer is sputtered onto the substrate. This is a conventional process. When this aluminum is sputtered onto the substrate, it will be sputtered in a conformal layer, such that the topology of the underlining substrate will be reflected in the topology of the upper surface of the aluminum layer 32. This is followed by an etching step, illustrated in FIG. 4, wherein the aluminum is vertically etched in such a manner that each of the vias 30 has a plug 36 remaining therein. The etching operation continues until the portion of the layer 28 disposed in the vias 30 is exposed, i.e., the aluminum is removed therefrom.

At this step in the process, all conventional processes have been utilized. The next step in the process for a conventional device would have utilized a different etching of step which merely requires patterning and etching the mirrored elements from the layer 32. If this would have been the step taken, the mirrored elements 38 would have a topology that would follow the underlying topology. It can be seen that these mirrored elements 38 are not optically flat. As such, this would not be a useful approach.

Figure 5:
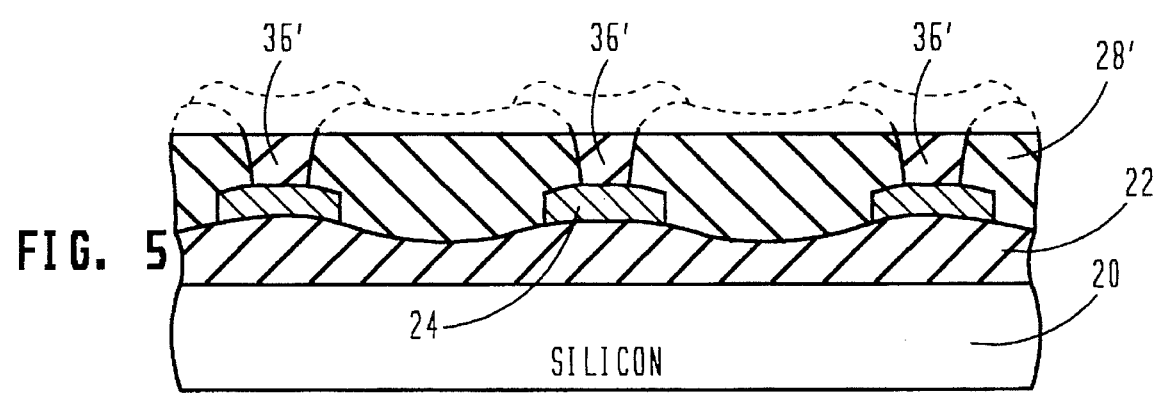

Referring now to FIG. 5, there is illustrated the next step in the process. In this process, a mechanical planarization technique is utilized. The wafer with its surface of silicon dioxide in the layer 28 and aluminum plugs 36 are subjected to this chemical/mechanical process. This planarization process is performed utilizing a planarization machine fabricated by Westech corporation. This is a polishing operation which takes between 14.5 to 30 minutes and utilizes a slurry material of SC-112, manufactured by Rodel with a slurry flow of 100-ml/min. The ph of the material is 10.8 with a carrier RPM of 30 and a platen RPM of 18. A polished pad is utilized of the type IC-1000, SubaIV manufactured by Rodel. The carrier pad is a 40R/40u, manufactured by Rodel with a wafer pressure of 7.0 psi is applied and the temperature of the operation is 80 degrees F. These values may be adjusted somewhat, depending upon the end-process inspections and the fact that the initial aluminum thickness on the oxide may vary slightly which will in turn vary the rate at which aluminum and oxide are removed from the wafer.

The use of a three micron layer of low stress silicon dioxide is an important process variable. This layer provides a buffer layer which may be planarized without danger of removal of a portion of the underlying circuitry. Since it is a low stress oxide, the wafer and the die will have less of a tendency to bow during later processing and after dicing the wafer. It can be seen in FIG. 5 that this results in an optically flat surface, with a new layer 28' resulting on the surface of the substrate.

Figure 6:
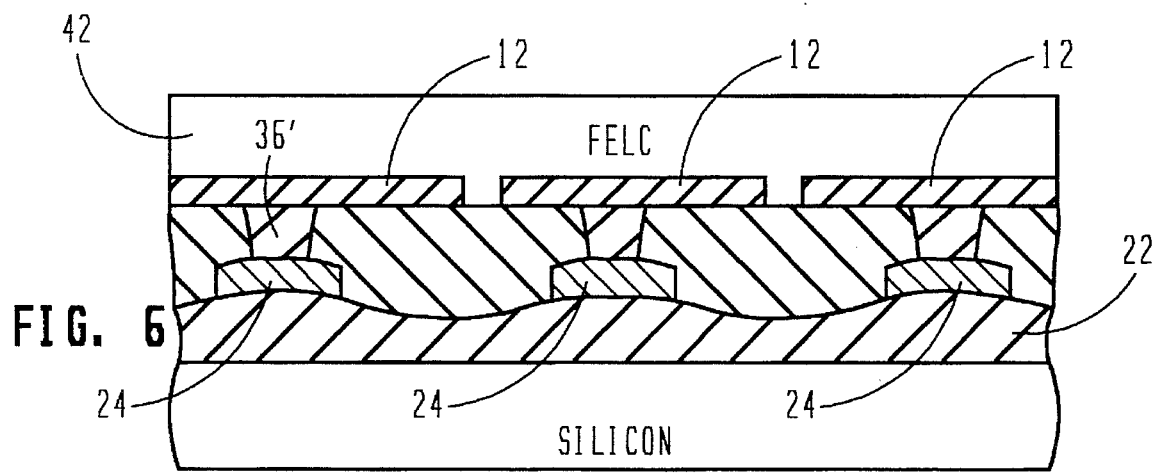

Referring now to FIG. 6, there is illustrated the next step in the process. A layer of aluminum of a thickness of approximately 1,500 Angstroms is sputtered onto the surface of the substrate and then patterned and etched to form the mirrored elements 12. Since these are formed on a relatively flat surface compared to the original surface, the result is optically flat mirrors which significantly improve the reflection of substantially all of the light that impinges on the surface thereof, as opposed to the prior art system which resulted in scattering of a large portion thereof. Due to the small geometry necessary to realize high density arrays of mirrored elements, this provides a significant advantage. Thereafter, a layer of FELC gel is disposed on the surface thereof, forming the liquid crystal element 14.

Figure 7:
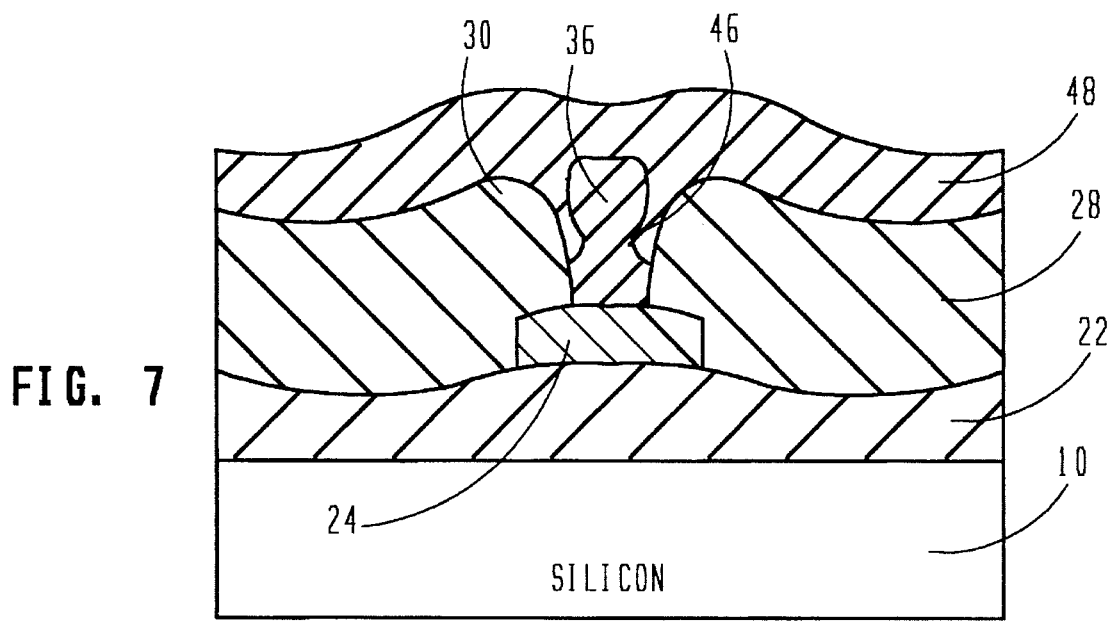
FIGS. 7 and 8 illustrate an additional step to compensate for intermediate etching problems.

Referring now to FIG. 7, there is illustrated an additional step in the process of the present invention. In FIG. 7, the plug 36, when formed, is over etched resulting in a downwardly extending valley 46. This extends down the wall of the via 30 to such a level that, if the substrate were planarized, there would remain some of this valley 46. This is due to the fact that the planarizing operation can only etch away so much of the oxide layer 28. The over etching can be of such a nature in certain areas of the substrate that the valley 46 would extend down to the conductive strip 24. If the above described process were followed without any additional steps, this would result in a valley that is disposed about the plug 36 on the peripheral edges thereof. If a subsequent layer of aluminum were to deposited that were to form the layered surface, this result in a small valley disposed around the peripheral edges of the plug 36. Again, this would detract from the optical flatness thereof.

Figure 8:
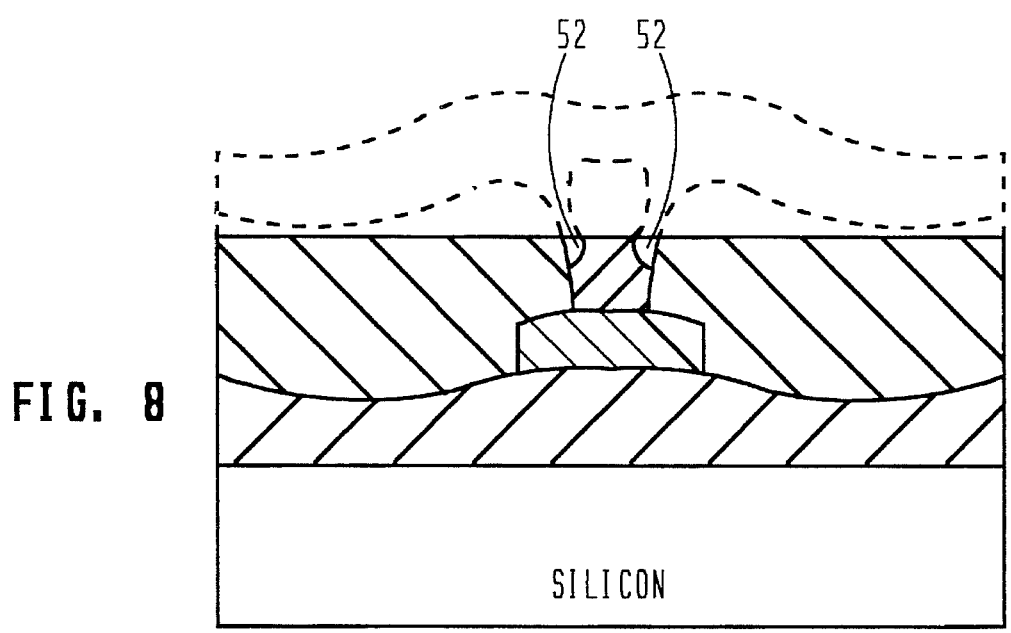

In order to cure this problem, optical inspection would be utilized to determine if an over etching operation existed. If so, then a thin layer of aluminum would be sputtered onto the substrate to a thickness of approximately two microns. Thereafter, the planarizing operation would take place and remove the layer of aluminum 48. This would result in the structure of FIG. 8, it being seen that there is a remnant 52 of the layer 48 that is disposed about the plug 36 to provide the fill for the operation of forming the mirrored elements 12.

Since optical inspection is utilized in order to determine if another step of aluminum sputtering is required, the additional layer of aluminum can be deposited on the substrate either prior to planarization or after planarization. For example, if it is noted that the vias are under filled, i.e., there is a dimple in the center of the contact, the additional layer of aluminum can be deposited prior to planarization. However, if it is noted after etching that there is a potential over etching of the edges of the aluminum, another layer of aluminum can be deposited on the substrate at that time prior to the planarization step. In any event, the planarization step will remove substantially all of the aluminum layer with the exception of that disposed in the vias.

In summary, there has been provided a technique for providing a mirrored SLM having an array of mirrored elements on a substrate under which control elements are provided. The control elements control each of the mirrored elements to apply a voltage thereto and control the rotation through an overlying layer of liquid crystal material. The technique for fabricating the substrate and the mirrored elements requires first forming control elements within the substrate with conductive strips or pads formed on the upper level of the substrate. A layer of low stress oxide is then disposed over the substrate in a conformal layer and then openings formed in the upper layer of oxide to expose the conductive control strips or pads. Plugs of aluminum are then formed therein by sputtering on a layer of aluminum and etching back the aluminum layer. This is then followed by a chemical/mechanical planarization technique wherein the surface of the substrate is polished to provide an optically flat surface and remove substantially all of the contours resulting from the semiconductor processing. Once this polishing step is finalized, a layer of aluminum is then sputtered over the substrate and then patterned and etched to form the mirrored elements.

Although the preferred embodiment has been described in detail, it should be understood that various changes, substitutions and alterations can be made therein without departing from the spirit and scope of the invention as defined by the appended claims.

What is claimed is:

1. A method for forming a spatial light modulator, comprising the steps of:

forming a substrate of control elements having an irregular surface;

depositing a conformal insulating layer of buffer material over the substrate;

forming vias in the buffer layer to expose underlying control elements;

depositing a conformal layer of conductive material over the buffer layer and vias to fill the vias;

downwardly etching the conformal layer of conductive material to remove substantially all of the conformal layer of conductive material with the exception of a portion thereof that is disposed in the vias;

chemical planarizing the surface of the substrate such that the plugs are not removed;

forming mirrored elements on the upper surface of the substrate over substantially all of the remaining portions of the plugs; and disposing a layer of liquid crystal material over the substrate that has characteristics that will change in response to a voltage applied to the mirrored elements.

2. The method of claim 1, wherein said conformal conductive layer is comprised of aluminum.

3. The method of claim 2, wherein the step of forming the conformal layer of conductive material utilizing aluminum utilizes a sputtering technique.

4. The method of claim 1, wherein the step of forming mirrored elements comprise the steps of:

forming a conformal layer of aluminum over the substrate to a thickness; and patterning and etching the conformal layer of aluminum to form the mirrored elements.

5. The method of claim 1, wherein the step of depositing a conformal layer of insulating buffer material comprises depositing a layer of low stress oxide over the substrate.

6. The method of claim 1, and further comprising the further steps after the step of downwardly etching of:

depositing a second conformal layer of conductive material over the upper layers of the substrate to a thickness; and wherein the step of planarizing is operable to remove the portion of the second conformal layer between the vias.

7. The method of claim 1, wherein the step of planarizing utilizes a chemical/mechanical process.

* * * * *